United States Patent [19]
Johnson et al.

[11] Patent Number: 5,626,382
[45] Date of Patent: May 6, 1997

[54] MOLDED PLASTIC PANEL HAVING INTEGRATED, LOCALIZED SOFT-TOUCH AESTHETIC FEATURE

[75] Inventors: David H. Johnson, Canton, Mich.; William M. Bolle, Manitowoc, Wis.; Eric C. Buckley; Theodore J. Peterson, both of Sheboygan, Wis.

[73] Assignee: Lear Corporation, Southfield, Mich.

[21] Appl. No.: 416,033

[22] Filed: Apr. 3, 1995

[51] Int. Cl.6 .................................................. B60J 5/00
[52] U.S. Cl. .................................... 296/146.7; 296/153
[58] Field of Search .............................. 296/146.7, 153; 409/502

[56] References Cited

U.S. PATENT DOCUMENTS

| | | | |
|---|---|---|---|
| 3,989,275 | 11/1976 | Finch et al. | 296/146.7 X |
| 4,474,635 | 10/1984 | Adams | 156/245 |
| 4,779,390 | 10/1988 | Repper et al. | 52/222 |
| 4,781,956 | 11/1988 | Zimmerman et al. | 428/43 |
| 4,802,948 | 2/1989 | Zimmermann et al. | 156/500 |
| 4,810,452 | 3/1989 | Taillefert et al. | 264/247 |
| 4,873,045 | 10/1989 | Fujita et al. | 264/259 |
| 5,040,335 | 8/1991 | Grimes | 296/146.7 X |
| 5,071,605 | 12/1991 | Kawaguchi et al. | 264/45.2 |
| 5,073,318 | 12/1991 | Rohrlach et al. | 264/46.5 |
| 5,200,252 | 4/1993 | Kelman | 428/159 |
| 5,224,299 | 7/1993 | Abe | 49/502 |

FOREIGN PATENT DOCUMENTS

| 4-169346 | 6/1992 | Japan | 296/146.7 |
|---|---|---|---|

*Primary Examiner*—Andrew C. Pike
*Attorney, Agent, or Firm*—Foley & Lardner

[57] ABSTRACT

A molded plastic panel according to the invention has an integrated, localized elastomeric plastic pad or flexible-foam pad positioned between an aesthetic cover sheet such as vinyl and a rigid, structural plastic substrate. The cover material is sufficiently flexible to yield readily under the weight of a human hand, permitting a person to feel the soft pad underneath. On the other hand, the pad is resilient, but not so resilient that it pushes out against the cover material, forming an unsightly bulge that traces the outline of the pad. The present invention achieves both of these features, particularly in combination with a reaction injection-molded plastic substrate.

10 Claims, 3 Drawing Sheets

MOLDED PLASTIC PANEL HAVING INTEGRATED, LOCALIZED SOFT-TOUCH AESTHETIC FEATURE

TECHNICAL FIELD

This invention relates to molded plastic panels for automobiles, aircraft, and similar interiors, wherein the panels have one or more integrated soft-touch aesthetic features such as an armrest.

BACKGROUND OF THE INVENTION

Interior trim automobile components commonly have cushioned, soft-touch aesthetic features. In particular, automotive interior door panels often have localized cushioned areas in tile armrest or bolster area. Such localized softness may be imparted by a flexible-foam or elastomeric pad of varying thickness surrounded by a relatively harder durometer cover sheet material.

A number of processes have been proposed for making cushioned armrests and the like in automotive interior door panels. U.S. Pat. No. 5,073,318 for a "Vehicle Inner Panel" discloses a first forming step of molding a substrate layer followed by a second step of molding a foam padding material between the substrate layer and an elastomeric facing layer. U.S. Pat. No. 5,224,299 for "Vehicular Door Structure" describes a door trim including a foamed pad member, an outer skin member for covering the foamed pad member, and a framework embedded in the foamed pad member for reinforcing the door trim. U.S. Pat. No. 4,474,635 for "Method of Selective Bonding of Textile Materials" teaches a method for compressing the molten surface of a non-woven substrate layer into the interstices of a surface fabric after first positioning a piece of foam cushioning therebetween.

Reaction injection molding is a known process for forming molded articles between male and female mold halves; see BASF U.S. Pat. No. 5,208,269. A known interior panel incorporating a cushioned armrest made by reaction injection molding includes a foam pad sandwiched between a vinyl cover and a polyurethane panel substrate. The foam is compressed due to the pressure of molding, e.g., up to about 55 psi, then expands once as the pressure is released. Since the molded back or substrate of the door panel is rigid, the foam presses outwardly against the cover, forming an unsightly visible bulge in the area of the armrest tracing the outline of the armrest cushion.

According to another version of such a product, this outline, or "read line" was eliminated by thickening the cover material so that bulging did not occur. However, such thickening made the armrest stiffer and, to a large extent, defeated the purpose of having a cushion in the first place. When touching this armrest, the user can barely feel that a cushion is present, and the feel of the armrest is essentially rigid like the cover material. Thus, a need persists for a cushioned armrest construction that can be made using injection molding that provides a soft, cushioned feel, yet avoids unsightly bulging caused by rebounding of the cushion.

SUMMARY OF THE INVENTION

A molded plastic panel according to the invention has an integrated, localized elastomeric plastic pad or flexible-foam pad positioned between an aesthetic cover sheet such as vinyl and a rigid, structural plastic substrate. The cover material is sufficiently flexible to yield readily under the weight of a human hand, permitting a person to feel the soft pad underneath. On the other hand, the pad is resilient, but not so resilient that it pushes out against the cover material, forming an unsightly bulge that traces the outline of the pad. The present invention achieves both of these features, particularly in combination with a reaction injection-molded plastic substrate.

According to one aspect of the invention, an integrated armrest is formed in a door panel by first bonding a flexible-foam armrest pad to a plastic sheet before, during or after forming of the sheet. It is particularly advantageous to bond the pad to the sheet at the same time as the sheet is formed, since this eliminates the need to perform these operations as separate steps.

The formed sheet with attached pad, treated as a unit, is subsequently attached to a structural substrate by in-situ molding which simultaneously forms the substrate and bonds the cover/pad assembly to the substrate. The resulting molding is a unitized door panel that integrates an aesthetic cover sheet, a localized soft armrest, and a molded plastic panel. During molding, the molding conditions and the characteristics of the material are adjusted in a manner to effectively eliminate a visible outline of the localized soft area. The localized soft area is thus not visually detectable, but can be easily felt due to its high compressibility. These and other objects, features, and advantages of the present invention will become apparent from the following detailed description.

BRIEF DESCRIPTION OF DRAWINGS

The invention will be further described with reference to the accompanying drawings, wherein like numerals denote like elements, and.

DETAILED DESCRIPTION OF PREFERRED EMBODIMENTS

Figure 1:
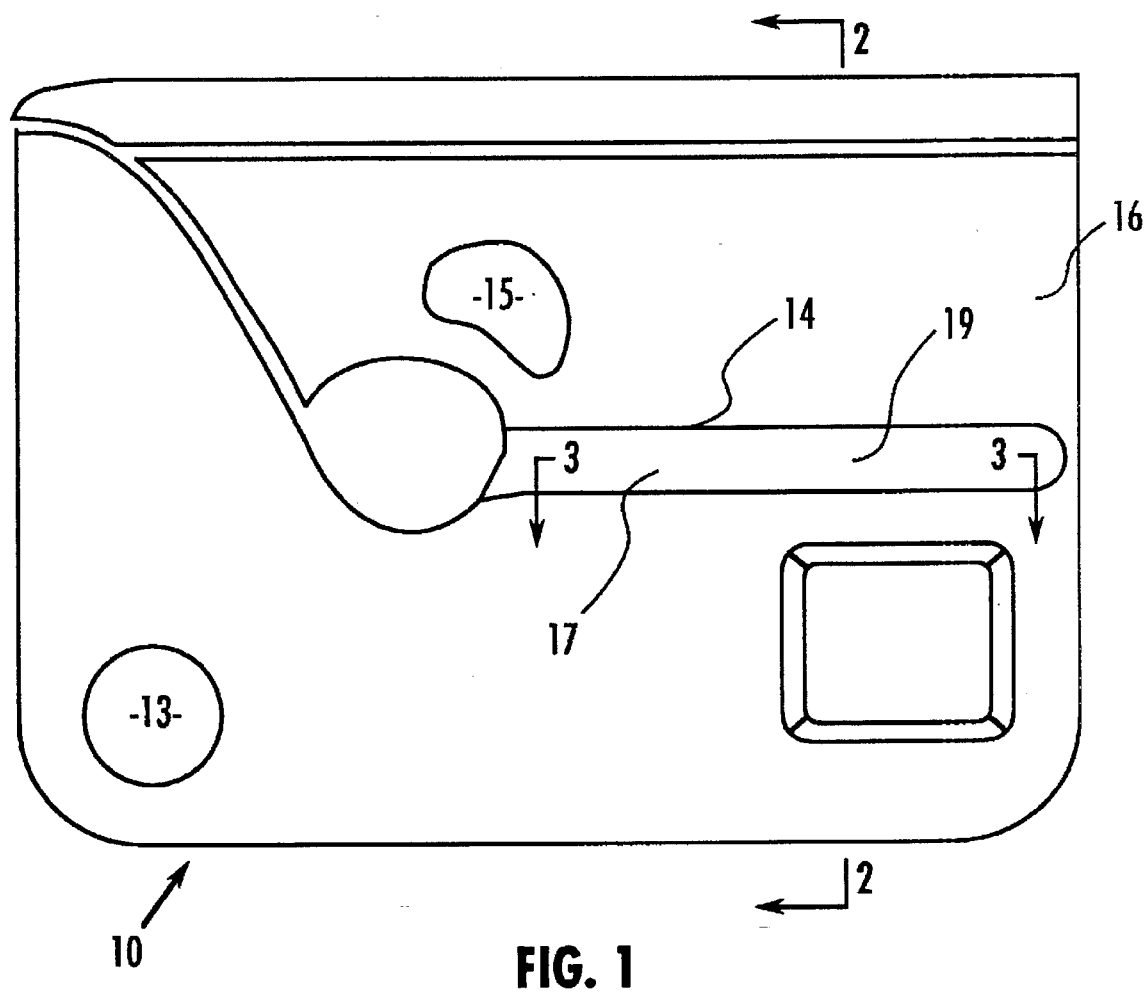
FIG. 1 shows a plan view of a door panel molding according to the invention having a cushioned armrest.
Figures 2, 3:
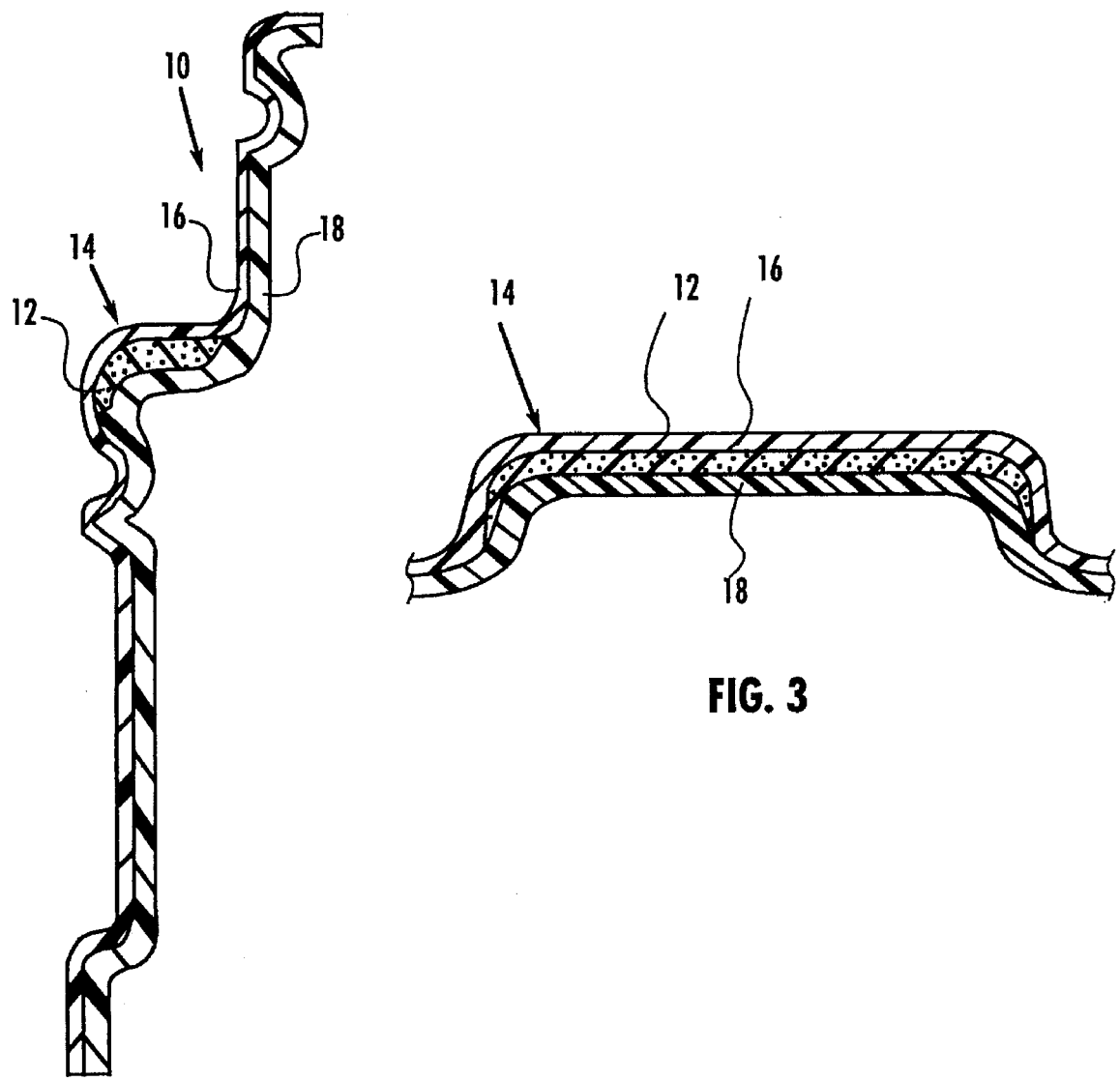
FIG. 2 is a cross-sectional view of the door panel of FIG. 1 taken along line 2—2.
FIG. 3 is a lengthwise sectional view of the door panel of FIG. 1 taken along line 3—3.

Panels for automobile interiors can include localized cushioned areas such as in the armrest or bolster area of a side-trim door, console, instrument panel, and the like. FIGS. 1 to 3 illustrate a interior molded plastic door panel 10 for a motor vehicle wherein a foam pad 12 is sandwiched between a relatively harder durometer cover material 16 and a rigid plastic substrate 18. Panel 10 is shown in a semi-finished state in which it has openings 13, 15 therein for mounting door hardware, a stereo speaker, and the like.

An armrest 14 according to the invention is formed as a rounded horizontal shelf 19 extending from the rear edge of panel 10 to approximately its center about halfway up panel 10. Pad 12 conforms to the shape of armrest 14, and is preferably generally L-shaped in configuration, so that a bottom edge portion of pad 12 curls down around a rounded sidewall 17 of the armrest. In this manner a passenger can feel the pad on the horizontal top surface of the armrest, or on adjoining surfaces that the passenger's hand may come in contact with.

Cover material 16 conceals pad 12 in a manner effective to conceal the outline of pad 12. This lack of a visible outline in cover material 16 overlying the boundary between soft pad 12 and substrate material 18 may be referred to as "no-read line" construction. Elimination of a read line can be achieved by a variety of measures discussed below dealing with the manner in which panel 10 is made.

Figure 4:
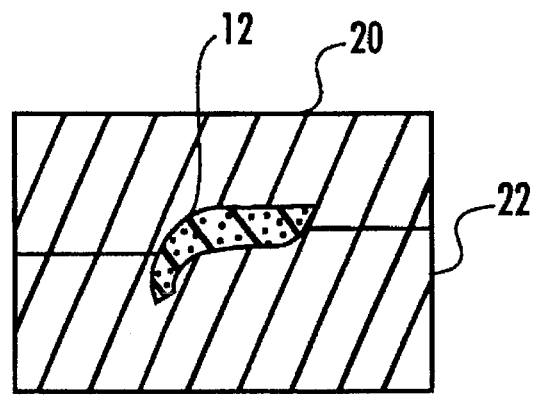
FIG. 4 is a cross-sectional view of a mold used to form a foam pad for use in the present invention.
Figure 5:
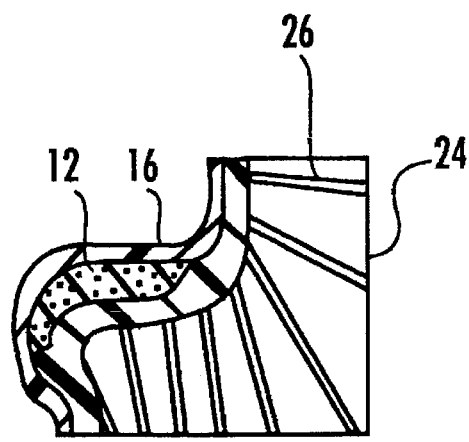
FIG. 5 is a partial, cross-sectional view of a vacuum forming tool used to form a plastic cover sheet while simultaneously bonding a soft foam pad to the cover sheet.
Figure 6:
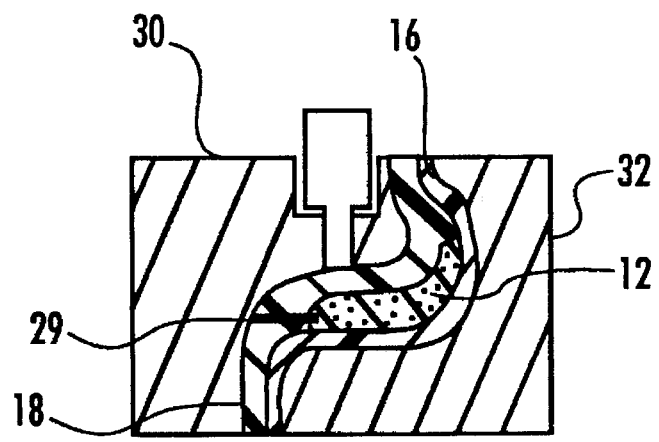
FIG. 6 is a partial, cross-sectional view of a reaction injection molding apparatus for finishing the panel assembly shown in FIG. 5.

Referring now to FIGS. 4 to 6, an exemplary process of the invention begins with the molding of pad 12 between first and second mold halves 20, 22. Alternately, pad 12 need not be molded to shape, but may instead be cut to shape out of elastomeric or foam sheet stock. According to the preferred form of the invention, pad 12 is made of a closed cell foam impermeable to gas and liquid. Such an article may be made from a variety of plastic foam materials such as a solid elastomer, a self-skinning foam, a chemically blown elastomer of closed-cell or microcellular structure, or by having a skin material molded-in during the molding of the article. Examples of such plastics are polyethylene, polypropylene, polyurethane, and polystyrene foams. The preferred closed-cell nature of pad 12 prevents the seepage of liquid urethane into pad 12 during the molding of substrate 18, which can result in loss of softness and uneven degrees of softness in the finished product.

The material of pad 12 is of a density and resiliency to impart a soft feel, yet still be resistant to compression caused by molding pressures. The density of the foam may be from about 4 to 60 pounds per cubic foot (pcf), but preferably from about 12 to 25 pcf in order to minimize the pad's tendency to rebound. If a more compressible and resilient foam material is used, it will have a greater tendency to bulge once substrate 18 molding is completed, while if a less compressible foam is used, it will not exhibit the desired soft-feel effect. For these purposes, the indentation load deflection of the pad (ILD) may be from about 10 to 20 lbs, optimally about 12 lbs.

Pad 12 may have any shape desired for the soft-touch feature in the final product, and may have tapered or squared edges. A gradually tapered or feathered peripheral edge is preferred insofar as such a shape provides a smooth transition from the pad to the underlying rigid substrate and helps provide the no-read line appearance in the finished molding.

Excessive compression of pad 12 should be avoided during the molding of substrate 18 since it may lead to rebound as the part is removed from the mold, causing unsightly distortion. The thickness of pad 12 is designed to impart softness yet minimize rebound, and for this purpose is typically 0.2 to 2.0 inches thick, most preferably from 0.2 to 0.5 inches thick for door panel applications such as armrests. In general, if pad 12 is too thin it will be insufficiently soft, whereas if pad 12 is too thick, it will have a greater tendency to compress during molding, leading to a greater tendency to rebound.

Once pad 12 is made, an adhesive may be applied directly to its outer surface in the area that will be joined to the back of aesthetic plastic cover sheet 16. The glue should be such that it does not permit pad 12 to pull away from cover sheet 16 to form a gas bubble therebetween. This adhesive may be a solvent-based or water-based adhesive, or a thermoplastic film adhesive. If a thermoplastic film adhesive is used, it can be molded in during the molding of pad 12.

Next, pad 12 with its applied adhesive is placed on a known vacuum-form mold 24, while aesthetic plastic cover sheet 16, such as a vinyl sheet, is heated in a vacuum-forming oven to its molding temperature and simultaneously vacuumed onto mold 24 and pad 12. Pad 12 must, of course, have a sufficiently high temperature resistance so that it will not melt or degrade during molding of the cover sheet. FIG. 5 shows mold 24 with pad 12 and cover sheet 16 formed thereto by use of suction applied through vacuum holes 26 in mold 24. The heat contained in plastic cover sheet 16 activates or aids the adhesive bonding, joining pad 12 to cover sheet 16. Heat is applied to the vinyl sheet via a vacuum-forming oven which consists of upper and lower infrared heater banks that heat the sheet from both sides. The foregoing embodiment of the method of the invention is particularly advantageous in that it simultaneously forms the sheet into the required shape and bonds the pad to the inner surface of the sheet, reducing two operations to one.

In a preferred embodiment, plastic cover sheet 16 is comprised of a bilaminate sheet of cross-linked polypropylene foam lining on a flexible vinyl covering material, which is a type conventionally used in automotive interiors. Either a solid or expanded type vinyl skin may be used. Cover sheet 16 has a preferred thickness of from about 0.04 to 0.14 inch (1 to 3.5 mm), typically 0.1 inch, in order to provide sufficient strength and flexibility without excessive rigidity.

As described above, pad 12 is preferably installed during the forming of aesthetic plastic cover sheet 16, eliminating any further steps for installing the soft foam pad. However, plastic cover sheet 16 could be formed by itself on the vacuum form mold, or by a method other than vacuum-forming, and then pad 12 can be attached to cover sheet 16 by an adhesive thereafter. According to a another aspect of the invention, the adhesive is eliminated entirely by inserting cover sheet 16 directly into the mold used to make pad 12 so that cover sheet 16 is bonded to pad 12 at the same time that pad 12 is molded and formed. The urethane reaction that takes place in the foam bonds the pad to the inner surface of cover sheet 16 without need for an adhesive.

In this version of the process, cover sheet 16 is first vacuum formed to the desired shape, and then uncured foam is applied directly to the inner surface of the sheet 16, which inner surface is generally coated with an adhesion promoter in its commercially available form. The sheet may then be placed in a mold in a manner similar to FIGS. 4–6, and the foam pad is formed in the presence of the inside of the vinyl sheet. No adhesive is needed because the bond formed between the foam and the inside of the sheet is sufficient to secure the pad to the sheet. Regardless of the process used to make pad 12, at this stage plastic cover sheet 16 and attached pad 12 are treated as a single cower and pad assembly.

Cover-pad assembly 12, 16 is transferred to a reaction injection mold cavity (or an injection mold cavity) either automatically or by hand. Reaction injection molding (RIM) refers to a molding process in which a reaction takes place within the mold. RRIM using polyurethane, for example, causes the urethane to foam and expand, filling the mold. In reinforced reaction injection molding, the process is similar except that a reinforcing material such as a fiberglass matt is also inserted in the mold and becomes embedded in the molded plastic. These processes differ greatly in practice from conventional injection molding, wherein liquid plastic fed into the mold cools and solidifies without reacting. However, despite the differences between these molding processes, some aspects of the present invention can be used in both injection molding and reaction injection molding, as described further hereafter.

The RIM cavity is located between first and second halves 30, 32 of a substrate molding tool used for simultaneously molding substrate 18 and bonding the cover-pad assembly thereto by reaction injection molding as shown in FIG. 6. Heated substrate material is bonded to the back of cover-pad assembly 12, 16 by in-situ molding so that pad 12 becomes enclosed between plastic cover sheet 16 and plastic substrate 18. Optionally, a mesh of reinforcing material such as fiberglass (not shown) may be said over the back of cover-pad assembly 12, 16 before the molding of substrate 18 so that the fiberglass becomes embedded in the finished panel.

The substrate molding pressure is typically between about 10 to 100 psi, preferably from about 10 to 30 psi. According to one aspect of the invention, lower molding pressures are preferred because the molding pressure influences the extent of pad 12 compression. Lowering the molding pressure from 55 psi to 20 psi, for example, lessens the tendency of pad 12 to bulge or rebound later on because less compression occurs during molding. For this purpose, the plastic used for molding of substrate 18 to cover-pad assembly 12, 16 is preferably of a type that can be molded at a low molding pressure. It should have a low viscosity and easy flow characteristics, which can be obtained by adjusting conditions such as the amount of blowing agent, amount of catalyst(s), and monomer content.

Pins 29 mounted on the inside of mold half 30 (see FIG. 6) extend through the mold cavity into one end of pad 12. During molding, pins 29 permit heated, expanding gas in the pad to escape. It has been found according to the invention that relieving gas pressure in this manner reduces the tendency of the pad to bulge. In the illustrated embodiment, several pins 29 are disposed at spaced positions, e.g., 1–2 inches apart, along the length of pad 12. Pins 29 need not be tubular; the gas escapes along the outside of pins 29 during the molding process. When the part is removed from the mold, small air passages extending through the molded substrate remain.

Another technique for lowering the molding pressure is to overclose or underclose the mold for a period of time during the molding of substrate 18. In the former case, the mold is overclosed to distribute the liquid reagents throughout the cavity more completely than would occur without overclosing. When a plastic has to flow to fill the mold, a relatively high pressure is needed. Overclosing the mold, for example from a normal gap of 4 mm to 2 mm, fills the mold during the first few seconds of molding when the plastic is at a low viscosity and needs only low pressure to move it through the cavity. After a few seconds the mold is reopened to its normal position, e.g., 4 mm, and the material reacts and fills the rest of the mold. Overclosing is discontinued while the reactants are still somewhat fluid, resulting in a lower peak molding pressure. This technique is effective in regular injection molding as well as for RIM and RRIM procedures.

A similar effect can be obtained by underclosing the mold during the initial stage of molding. In either case, the molding step generally lasts from about 45 to 120 seconds, and the period for overclosure or underclosure lasts from about 2–10 seconds.

To carry out the step of molding the substrate 18, a typical substrate molding tool used in molding rigid, low-density, reinforced or unreinforced structural blown polyurethane may be used. The mold may also be of the compression-molding type which molds a filled thermoplastic sheet into an interior-trim substrate while simultaneously bonding the substrate to the cover-material assembly. This is known as the Woodstock™ molding process as described in U.S. Pat. No. 4,228,116. Alternately, the mold can be of the injection-molding thermoplastic type. An advantage common to each of the above substrate molding processes is that the space required for pad 12 is minimized because substrate 18 is molded to the exact contour of the back side of cover-pad assembly 12, 16 without concern as to tolerances or the need for space to attach devices or secondary pieces for retaining the armrest. The latter advantage is important because space is scarce in car door constructions.

It should also be noted that the molded substrate bonds to pad 12 and cover sheet 16 during molding. The nature of such a bond is different from one formed, for example, by forming substrate 18 separately and then gluing it to the assembly of the cover sheet and pad. The bond is inherently cohesive, and is superior to an adhesive bond. Thus, the foregoing process of the invention gives rise to a physically unique and improved product.

It is also possible to intentionally distort the skin-side mold surface in the soft touch area in a manner effective to prevent bulging of the foam pad after molding. This can be done by, for example, providing a sliding, adjustable mold component that pushes in on the foam pad and vinyl skin in the area of the pad, compressing the pad and forming an indentation during molding. Later, once the substrate has solidified, the molded piece is removed from the mold and the pad bulges out, but only to its normal position, not to the extent that a read-line is formed. In this technique, the intentional distortion of the pad compensates for the rebound that occurs after removal from the mold.

After substrate 18 is molded, the three components of aesthetic cover 16, pad 12, and substrate 18 are substantially unitized by cohesive plastic bond interfaces. Since pad 12 is installed prior to or during the forming of substrate 18, molded panel 10 having integrated localized soft-touch features and a visibly undetectable border between softness and relative hardness is complete when it leaves the mold and requires no further finishing operations, except for operations unrelated to the soft touch feature.

The invention will be further described in the following example.

EXAMPLE

A soft armrest foam pad was molded from a microcellular water-blown flexible foam polyurethane. This system calls for mixing 81 parts isocyanate with 100 parts resin. The two chemicals were heated to 80° F and injected at 1,500 psi via a high pressure polyurethane delivery system into a mold cavity heated to 130° F. The foam pad was removed from the mold after 3 minutes.

This foam pad was then sprayed with a pressure sensitive water-based acrylic adhesive. The water solvent was flashed off at 160° F. for 3 minutes. Next, the foam pad with applied adhesive was placed on a vacuum, male-form mold with the glue-side out. An expanded vinyl skin was heated in an oven to a surface temperature of 300° F and transferred to the vacuum mold. As vacuum was applied, the skin was formed to the mold shape and simultaneously bonded to the foam pad. The vinyl remained on the mold for 15 seconds, a sufficient time so that the plastic could cool to a temperature below its forming temperature of 150° F.

The skin with attached foam was removed from the vacuum tool and transferred to a mold installed in a molding clamp. The vinyl was then placed in the female cavity half of the mold, and a sheet of fiberglass mat, weighing 1 oz. per square foot, was placed atop the vinyl. Additional injection molded plastic attachments, i.e., devices for locating points of attachment and attaching the door panel to the vehicle door, were inserted in the male cavity half of the mold.

The mold was closed to within one inch of being fully closed. Polyurethane liquid reagents were injected into the mold cavity through a high-pressure pour system. After a delay of two seconds, the clamp closed the mold completely. The reagents then foamed and expanded to fill the mold cavity and reacted to form rigid polyurethane. After 60 seconds, the mold was opened and the molding consisting of vinyl, foam pad, rigid glass-reinforced polyurethane and attachments was removed.

It will be understood that the foregoing description is of preferred exemplary embodiments of the invention, and that the invention is not limited to the specific forms shown. For example, soft-touch features other than armrests could readily be made using the method of the invention. This and other modifications may be made in the design and arrangement of the elements without departing from the scope of the invention as expressed in the appended claims.

We claim:

1. An automotive interior panel comprising:

an injection-molded, rigid plastic substrate configured to fit onto an inside of a vehicle door and having a shelf configured as an armrest;

a cover secured to an outer face of the substrate, the cover having sufficient flexibility to yield readily under the weight of a human hand; and a pad of resilient foam material covering part of the outer face of the substrate, which pad is disposed on the shelf of the substrate and closely secured between and encapsulated by the substrate and the cover along an outer peripheral edge of the pad, the cover covering the outer peripheral edge of the pad at an inwardly facing portion of the interior panel, so that the pad and a portion of the cover overlying the pad provide a soft, compressible cushion for the armrest without a visible outline of the pad being visible on the cover along the outer peripheral edge of the pad.

2. The panel of claim 1, wherein the pad is made of a closed-cell foam impermeable to liquid plastic used to form the substrate.

3. The panel of claim 2, wherein the pad has a thickness of from about 0.2 to 2.0 inches, a density of from about 4 to 60 pounds per cubic foot, and an indentation load deflection from about 10 to 20 lbs.

4. The panel of claim 2, wherein the pad has a thickness of from about 0.2 to 0.5 inch and a density of from about 4 to 25 pounds per cubic foot.

5. The panel of claim 1, wherein the pad is disposed on the shelf of the substrate and closely secured between and encapsulated by the substrate and the cover in a substantially uncompressed state.

6. The panel of claim 1, wherein the pad is generally L-shaped in cross section along most of its length, and includes a first portion covering the armrest shelf and a second portion that curves over an edge of the armrest shelf.

7. The panel of claim 6, wherein the pad is configured to cover only the armrest shelf and a portion of the substrate just below the edge of the armrest shelf.

8. The panel of claim 1, wherein the cover comprises a flexible vinyl material having a thickness in the range of about 0.04 to 0.14 inch.

9. The panel of claim 1, wherein at least a portion of the outer peripheral edge of the pad is tapered.

10. An automotive interior panel comprising:

an injection-molded, rigid plastic substrate configured to fit onto an inside of a vehicle door and having a shelf configured as an armrest;

a cover secured to an outer face of the substrate, the cover having sufficient flexibility to yield readily under the weight of a human hand; and a pad of resilient foam material disposed on the shelf of the substrate and closely secured between and encapsulated by the substrate and the cover along an outer peripheral edge of the pad, the pad being configured to cover only an armrest portion of the substrate including the shelf and an area of the outer face of the substrate proximate the shelf, the remainder of the outer face of the substrate being free of the pad, the pad and a portion of the cover overlying the pad providing a soft, compressible cushion for the armrest portion without a visible outline of the pad being visible on the cover along the outer peripheral edge of the pad.

* * * * *